(12) United States Patent
Schlipp

(10) Patent No.: US 7,118,158 B2
(45) Date of Patent: Oct. 10, 2006

(54) TRUCK TRAILER WITH MOVABLE SIDEWALLS

(76) Inventor: Randall C. Schlipp, 50057 County Line Rd., Dowagiac, MI (US) 49047

( * ) Notice: Subject to any disclaimer, the term of this patent is extended or adjusted under 35 U.S.C. 154(b) by 70 days.

(21) Appl. No.: 11/044,509

(22) Filed: Jan. 27, 2005

(65) Prior Publication Data

US 2006/0163903 A1    Jul. 27, 2006

(51) Int. Cl.
*B60P 7/02* (2006.01)

(52) U.S. Cl. ............................. 296/100.03; 296/100.04

(58) Field of Classification Search ........... 296/100.03, 296/35.3, 100.04, 100.05, 377.09
See application file for complete search history.

(56) References Cited

U.S. PATENT DOCUMENTS

| | | | | |
|---|---|---|---|---|
| 2,866,663 A | | 12/1958 | Ashford | |
| 2,974,996 A | | 3/1961 | Bitterman et al. | |
| 3,155,419 A | | 11/1964 | Garson et al. | |
| 3,252,730 A | | 5/1966 | Chieger et al. | |
| 3,266,837 A | | 8/1966 | Stricker, Jr. et al. | |
| 3,773,380 A | * | 11/1973 | Stockdill | 296/100.04 |
| 3,788,684 A | * | 1/1974 | Johnson et al. | 296/36 |
| 3,897,100 A | * | 7/1975 | Gardner | 296/100.05 |
| 4,648,649 A | * | 3/1987 | Beal | 296/100.04 |
| 5,052,739 A | * | 10/1991 | Irwin | 296/100.04 |
| 5,152,575 A | * | 10/1992 | DeMonte et al. | 296/100.12 |
| 5,282,663 A | | 2/1994 | Horton | |
| 5,498,057 A | * | 3/1996 | Reina et al. | 296/100.12 |
| 5,538,313 A | * | 7/1996 | Henning | 296/100.12 |
| 5,924,759 A | * | 7/1999 | DeMonte et al. | 296/100.12 |
| 6,017,082 A | * | 1/2000 | Leoni | 296/100.03 |
| 6,059,349 A | * | 5/2000 | Doll et al. | 296/100.03 |
| 6,065,796 A | * | 5/2000 | Verduyn | 296/100.03 |
| 6,196,604 B1 | | 3/2001 | Hoh et al. | |
| 6,196,786 B1 | | 3/2001 | Shinohara | |
| 6,312,040 B1 | * | 11/2001 | Shinohara | 296/100.12 |
| 6,851,741 B1 | * | 2/2005 | Burg | 296/190.11 |

* cited by examiner

*Primary Examiner*—Kiran B. Patel
(74) *Attorney, Agent, or Firm*—Price, Heneveld, Cooper, DeWitt & Litton, LLP

(57) ABSTRACT

A truck trailer that can be loaded from the sides or from overhead and which allows cargo to be transported within an enclosure includes a trailer bed, and an enclosure that is linearly movable with respect to the trailer bed from a position in which the enclosure extends over the entire length of the trailer bed to a position in which substantially the entire trailer is uncovered. In certain embodiments, a roller and track mechanism is used for facilitating linear movement of the enclosure as a unit from an enclosing position to an open position.

11 Claims, 3 Drawing Sheets

TRUCK TRAILER WITH MOVABLE SIDEWALLS

FIELD OF THE INVENTION

This invention relates to truck trailers, and more particularly to a truck trailer having movable sidewalls that allow unfettered access to the trailer bed from the sides to facilitate loading and unloading of cargo.

BACKGROUND OF THE INVENTION

Truck trailers used for transporting freight include both open and closed bed trailers. Open bed trailers, commonly referred to as flatbed vehicles, offer the advantage of accommodating a variety of loads and are generally less expensive to produce. Further, the load on the trailer can be accessed from the sides and above as well as from the rear of the vehicle. However, these trailers have disadvantages in that the load is open to the environment and can be damaged in transit or readily pilfered. Further, it is not particle to transport certain types of cargo on an open bed trailer, especially during inclement weather.

Closed trailers have the advantage of providing superior protection and security for the load. However, the presence of a conventional enclosure with a fixed height roof limits access to the load, makes loading of the trailer more difficult, and results in less useable space for the same size trailer bed width and limits the use of forklifts to load the trailer as the trailer roof interferes with the ability of the forklift operator to adequately lift the load. Further, the mere presence of the walls and roof of the enclosure limits the ability to utilize the full internal width and height of the enclosed trailer without hand stacking.

In addition, in order to accommodate all types of freight, a carrier must maintain an inventory of both open and closed trailers. Inventory requirements could be reduced by a truck trailer that can be easily loaded from the sides or from overhead, as with a conventional flatbed trailer, yet have an enclosure that provides added protection and security for the load.

Open trailers are typically utilized for transporting crushed vehicle bodies, since there is not any practical method for quickly and easily loading a crushed vehicle body onto a covered trailer. However, new Federal laws require that crushed autobodies transported on a trailer are covered to prevent any loose debris from falling from the trailer onto the roadway. Conventional methods of covering crushed automobiles (or other cargo) involve placing a tarp over the cargo. This is often very difficult and may subject operators to injury due to falls while placing the tarp.

U.S. Pat. No. 6,017,082 describes a truck trailer body system with movable enclosure sections, which are preferably slidingly nestable canopies. The canopies are positionable for completely enclosing and protecting cargo from environmental damage during transportation or storage, and also for selectively providing unfettered access to areas of the trailer bed for loading and unloading.

U.S. Pat. No. 6,196,604 describes a removable enclosure for a flatbed vehicle. The enclosure comprises a panel roof supported by four upright supports for removably mounting on an open bed trailer. Two upright supports are located on the left and right corners (the driver side and passenger side) of the forward edge of the trailer, and the other two uprights are located at the rear corners of the trailer. Two movable and removable side supports typically are used with the disclosed enclosure. Elevating means within the upright supports allow the front and/or rear portions of the roof to be raised and lowered separately. Using external attachable fixtures and ground mounted supports, each of the roof supports can be lifted from their mounted position on the trailer bed and the trailer can be driven out from under the supports and roof assembly, converting a covered van to a fully open van. A tarpaulin, or other readily removable wall materials, can be suspended from the roof and attached to the trailer bed.

U.S. Pat. No. 6,196,786 discloses a cargo transporting vehicle having a flap unit mounted as a cargo containing unit on a flatbed trailer so that it can be freely moved along the longitudinal direction of the truck. The flap unit comprises pillars that form the framework for the cargo containing unit. Each of the pillars includes an upper wheel and a lower wheel that sandwich a flange of an I-beam member. This arrangement allows the pillars to be moved along the length of the trailer to cover or uncover the trailer bed. Side panels which form the sidewalls of the trailer cover, and roof panels are hinged to the pillars so that they can be folded or swung into a position that allows the pillars to be rolled forward toward the front of the trailer to uncover the flatbed.

Other patent publications that address similar issues include U.S. Pat. Nos. 5,282,663; 3,266,837; 3,252,730; 3,155,419; 2,974,996 and 2,866,663.

SUMMARY OF THE INVENTION

The invention provides a truck trailer having a trailer bed and an enclosure that is movable with respect to the trailer bed between a position in which sidewalls of the enclosure extend upwardly adjacent the side edges of the flatbed, and a position in which the sidewalls are located outboard of the rear edge of the trailer bed to provide complete and unfettered access of the entire trailer bed for loading or unloading cargo from the sides of the trailer or from overhead.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
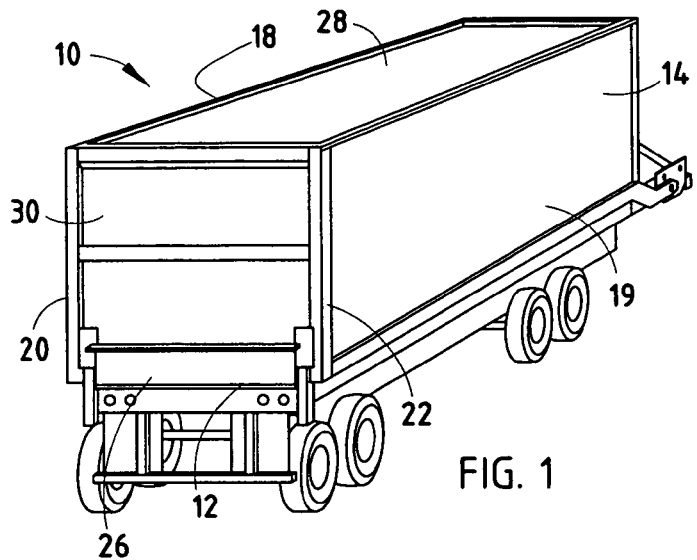
FIG. 1 is a perspective view of a truck trailer in accordance with an embodiment of the invention.
Figure 2A:
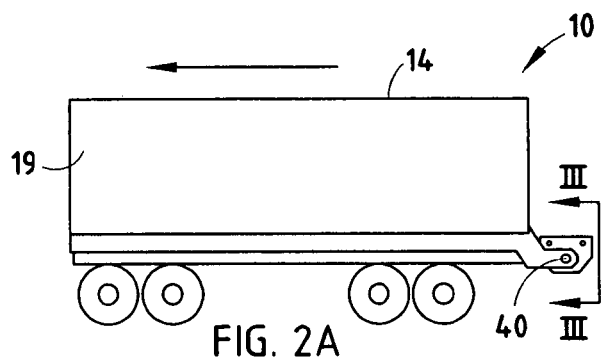
FIGS. 2A–2C are side elevational views showing a linearly movable enclosure in three different positions, including a fully closed or enclosing position, an intermediate position, and a fully open loading/unloading position, respectively.
Figure 2B:
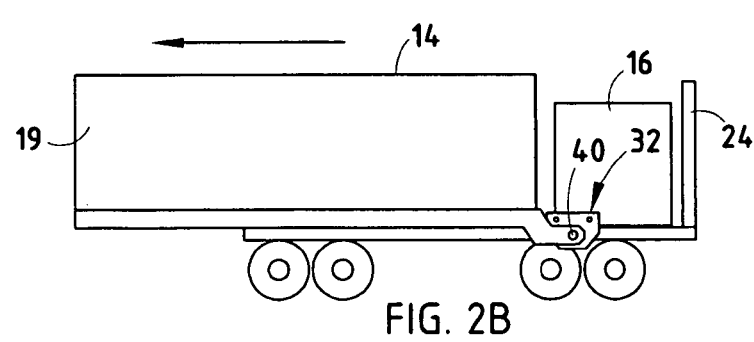
Figure 2C:
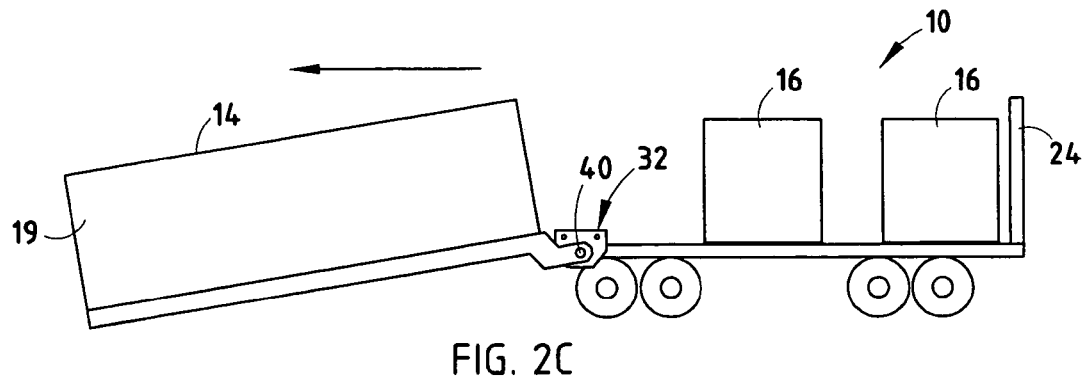
Figure 3:
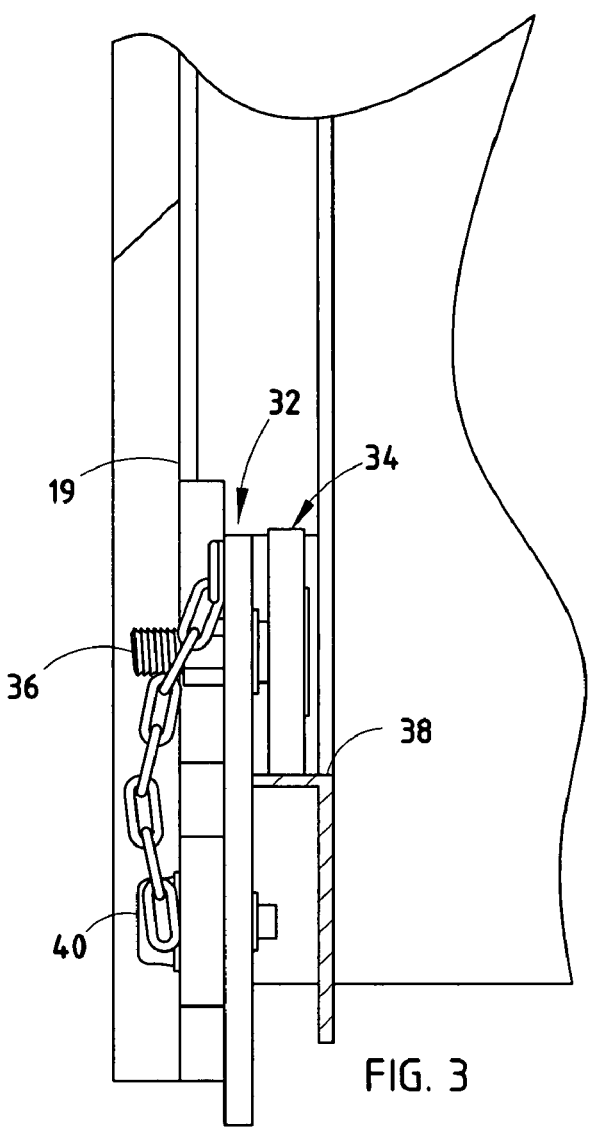
FIG. 3 is a transverse cross-sectional view of the truck trailer shown in FIG. 1.

Shown in FIG. 1 is a perspective view of a truck trailer 10 in accordance with an embodiment of the invention. Truck trailer 10 includes a trailer bed 12 and an enclosure 14 mounted on trailer bed 12. As shown in FIGS. 2A, 2B and 2C, enclosure 14 is linearly movable with respect to trailer bed 12 along substantially the entire length of the trailer bed. More specifically, enclosure 14 is movable with respect to trailer bed 12 between an enclosing position (FIG. 2A) and a fully open cargo loading/unloading position (FIG. 2C). FIG. 2B shows enclosure 14 at an intermediate position between the enclosing position and a fully open cargo loading/unloading position. Thus, it is possible to move enclosure 14 to an intermediate position as shown in FIG. 2B to allow cargo load 16 to be loaded on or unloaded from a forward area of trailer bed 12, while a rearward area of trailer bed 12 remains covered or concealed by enclosure 14. When enclosure 14 is in the fully closed or enclosing position (shown in FIG. 2A), opposite left sidewall 18 and right sidewall 19 (FIG. 3) each extend upwardly adjacent opposite sides 20 and 22 of trailer bed 12 along substantially the entire length between front end 24 of trailer bed 12 and rear end 26 of trailer bed 12, as shown in FIG. 2A. In the fully open cargo loading/unloading position (shown in FIG. 2C) opposite sidewalls 18 and 19 of enclosure 14 are located outboard or rearward of rear end 26 of trailer bed 12 (as shown in FIG. 2C) to provide unfettered access to substantially the entire length of trailer bed 12 along opposite sides 20 and 22. This allows trailer bed 12 to be easily loaded with cargo loads 16 (or unloaded) from the sides, such as with a forklift, or from overhead, such as with a crane.

The expression "enclosure" as used to describe and claim the invention is intended to encompass various non-articulated structures, which may be linearly moved as a unit with respect to a trailer bed along the length direction of the trailer bed, regardless of whether the structure includes a roof, and regardless of whether the structure includes a rear wall or door. The term "non-articulated" means that the sidewalls are not hinged, are not flexile, and cannot be folded or collapsed, and subsequently unfolded or extended to their original form.

In certain embodiments, enclosure 14 will include sidewalls 18 and 19, a roof 28 extending between upper edges of sidewalls 18 and 19, and a rear wall 30, to provide an enclosure structure which cooperates with a front wall 32 extending upwardly from front end 24 of trailer bed 12 to provide a complete, optionally weather tight, arrangement to protect and secure cargo in a manner similar to a conventional closed truck trailer. However, in certain cases, such as for hauling crushed vehicles, a roof is not necessary. In such case, a suitable enclosure 14 may comprise sidewalls 18 and 19, and a rear wall 30. In order to provide greater structural stability and rigidity, it may be desirable to include one or more cross members that extend between upper ends of walls 18 and 19. In particular, in the case of a roofless enclosure, it is desirable to include at least one cross member connecting the upper ends of sidewalls 18 and 19 at the front end of enclosure 14. In some cases, rear wall 30 may be omitted from enclosure 14. In the case that both rear wall 30 and roof 28 are omitted from enclosure 14, it will typically be desirable to provide at least two cross members that extend between upper edges of sidewalls 18 and 19, one at the front end of enclosure 14, and one at the rear end of enclosure 14. If desired, sidewalls 18, 19 and optional rear wall 30 may be provided with one or more doors, including hinged doors, sliding doors, rolling doors, etc.

Figure 4:
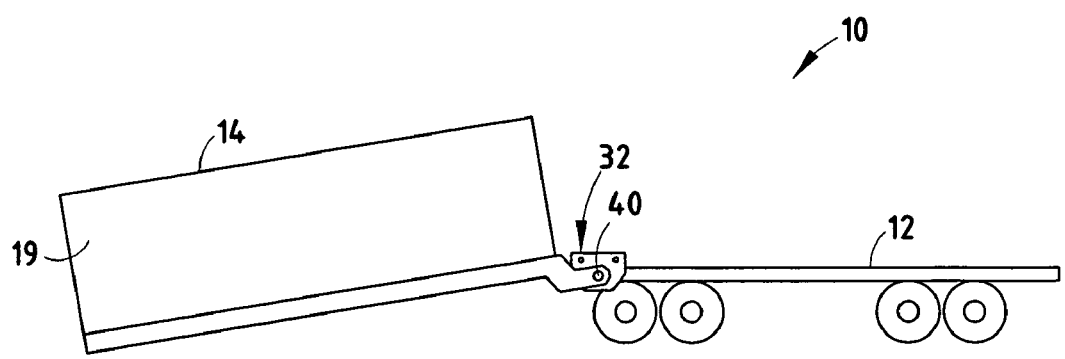
FIG. 4 is a side elevational view of a truck trailer including a roller and track mechanism for facilitating linear movement of an enclosure with respect to a trailer bed.
Figure 5:
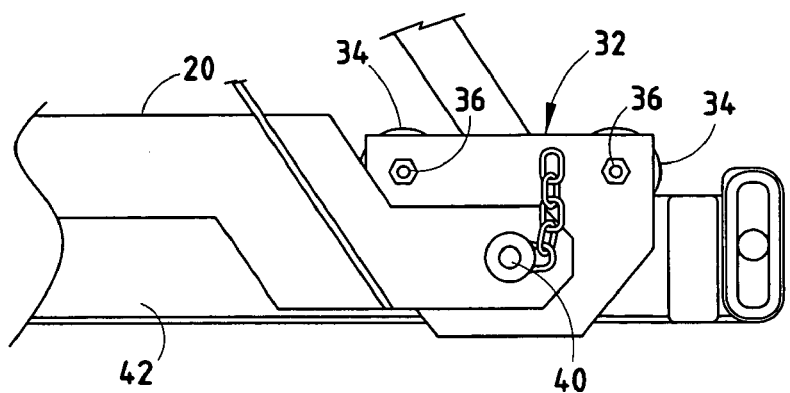
FIG. 5 is an enlarged view of the mechanism shown in FIG. 4 for facilitating linear movement of the enclosure with respect to the trailer bed.
Figure 6:
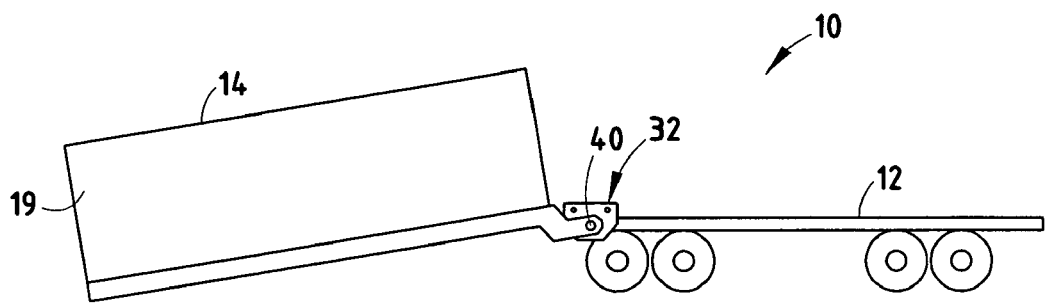
FIG. 6 is a side elevational view of a truck trailer employing an alternative mechanism for facilitating linear movement of the enclosure with respect to the trailer bed.
Figure 7:
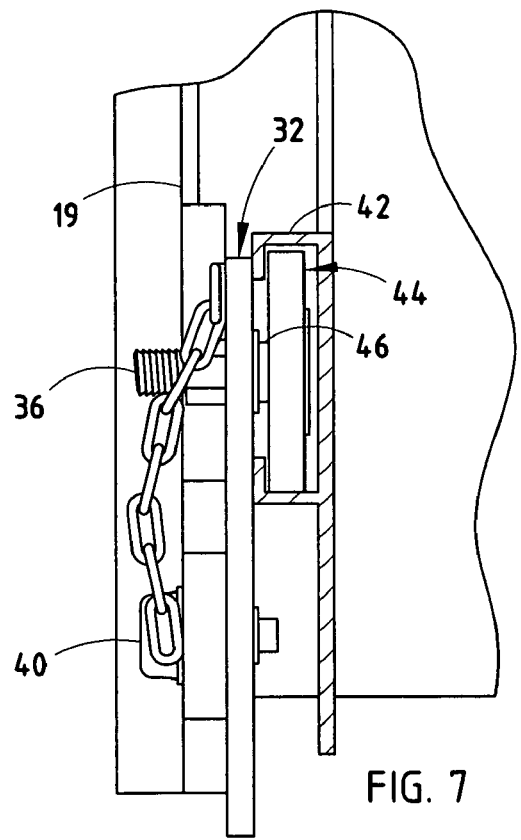
FIG. 7 is an enlarged fragmentary transverse cross-sectional view of the mechanism for facilitating linear movement of the enclosure with respect to the trailer bed shown in FIG. 6.

Any of various mechanisms may be employed for facilitating linear movable of enclosure 14 with respect to truck bed 12 along the length direction of the truck bed. Examples include various worm gear, screw drive or chain and sprocket arrangements. However, a preferred mechanism involves the use of rollers (e.g., wheels or ball bearings) that ride in or on a track or rail. A preferred mechanism (shown in FIGS. 3, 4 and 5) includes a trolly 32 having wheels 34 which rotate on axles 36 of trolly 32. Trolly 32 rides in channels or tracks 38 of trailer 10. Enclosure 14 is pivotally connected to trolly 32 at pivot 40. This mechanism allows enclosure 14 to be linearly moved rearwardly, such as which an end loader, forklift, tractor or other suitable device, and set down on the ground for loading and/or unloading of trailer bed 12. An alternative mechanism for facilitating linear movement of enclosure 14 which respect to truck bed 12 is shown in FIGS. 6 and 7. In this embodiment, a C-shaped channel 42 is attached to opposite sides of trailer 10 adjacent the sides of trailer bed 12, and a wheel 44 having an axle 46 is journaled to enclosure 14 at a lower forward end thereof.

As an alternative, it is possible to reverse the parts of the rollers and track mechanisms, so that the rollers (e.g., wheels, ball bearings or the like) are mounted on the trailer adjacent the trailer bed, and the track (or rail) is attached to enclosure.

Sidewalls 18 and 19 of enclosure 14 are fabricated using a material and a material thickness that provides relatively rigid walls. More specifically, sidewalls 18 and 19 are preferably sufficiently rigid so they cannot be bent or folded without being permanently deformed. Steel sheet metal is a suitable material for fabricating sidewalls 18 and 19.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A truck trailer comprising:
    a flatbed trailer; and
    a non-collapsible enclosure defining sidewalls that extend upwardly adjacent side edges of the flatbed trailer, the non-collapsible enclosure being movable rearwardly along the length of the flatbed trailer, while at least partially supported on the trailer, between a position in which the enclosure extends over the entire length of the flatbed trailer and a position in which substantially the entire flatbed trailer is uncovered, thereby providing unfettered access to the trailer bed along the opposite sides of the trailer bed.

2. A truck trailer comprising:
    a flatbed trailer having a front end, a rear end and opposite sides; and
    a non-collapsible enclosure having opposite sidewalls, the non-collapsible enclosure being movable rearwardly along the length of the trailer, while at least partially supported on the trailer, between an enclosing position in which each of the opposite sidewalls extends upwardly adjacent a respective one of the opposite sides of the flatbed trailer between the front end of the flatbed trailer and the rear end of the flatbed trailer, and a cargo loading/unloading position in which the opposite sidewalls are located outwardly away from the rear end of the flatbed trailer, thereby providing unfettered access to the trailer bed along the opposite sides of the trailer bed.

3. The truck trailer of claim 2, wherein the enclosure further comprises a roof.

4. The truck trailer of claim 2, wherein the enclosure further comprises a rear wall.

5. The truck trailer of claim 2, wherein linear movement of the enclosure with respect to the trailer bed is facilitated by a roller and track arrangement.

6. The truck trailer of claim 2, wherein linear movement of the enclosure with respect to the truck bed is facilitated by a wheel mounted on the enclosure and a channel mounted on the trailer adjacent the trailer bed, the wheel and channel being arranged so that the wheel travels in and rolls along the channel.

7. A truck trailer comprising:
a flatbed trailer having opposite sides and opposite ends;
a non-collapsible enclosure including sidewalls extending upwardly from the sides of the flatbed trailer; and
a mechanism facilitating movement of the enclosure as a unit rearwardly along the length of the trailer, while at least partially supported on the trailer, from an enclosing position in which the sidewalls extend upwardly from sides of the flatbed trailer to an open position in which the sidewalls are located outwardly away from the rear end of the flatbed trailer, thereby providing unfettered access to the trailer bed along the opposite sides of the trailer bed.

8. The truck trailer of claim 7, wherein the enclosure further comprises a roof.

9. The truck trailer of claim 7, wherein the enclosure further comprises a rear wall.

10. The truck trailer of claim 7, wherein linear movement of the enclosure with respect to the trailer bed is facilitated by a roller and track arrangement.

11. The truck trailer of claim 7, wherein linear movement of the enclosure with respect to the truck bed is facilitated by a wheel mounted on the enclosure and a channel mounted on the trailer adjacent the trailer bed, the wheel and channel being arranged so that the wheel travels in and rolls along the channel.

* * * * *